Figure 1:
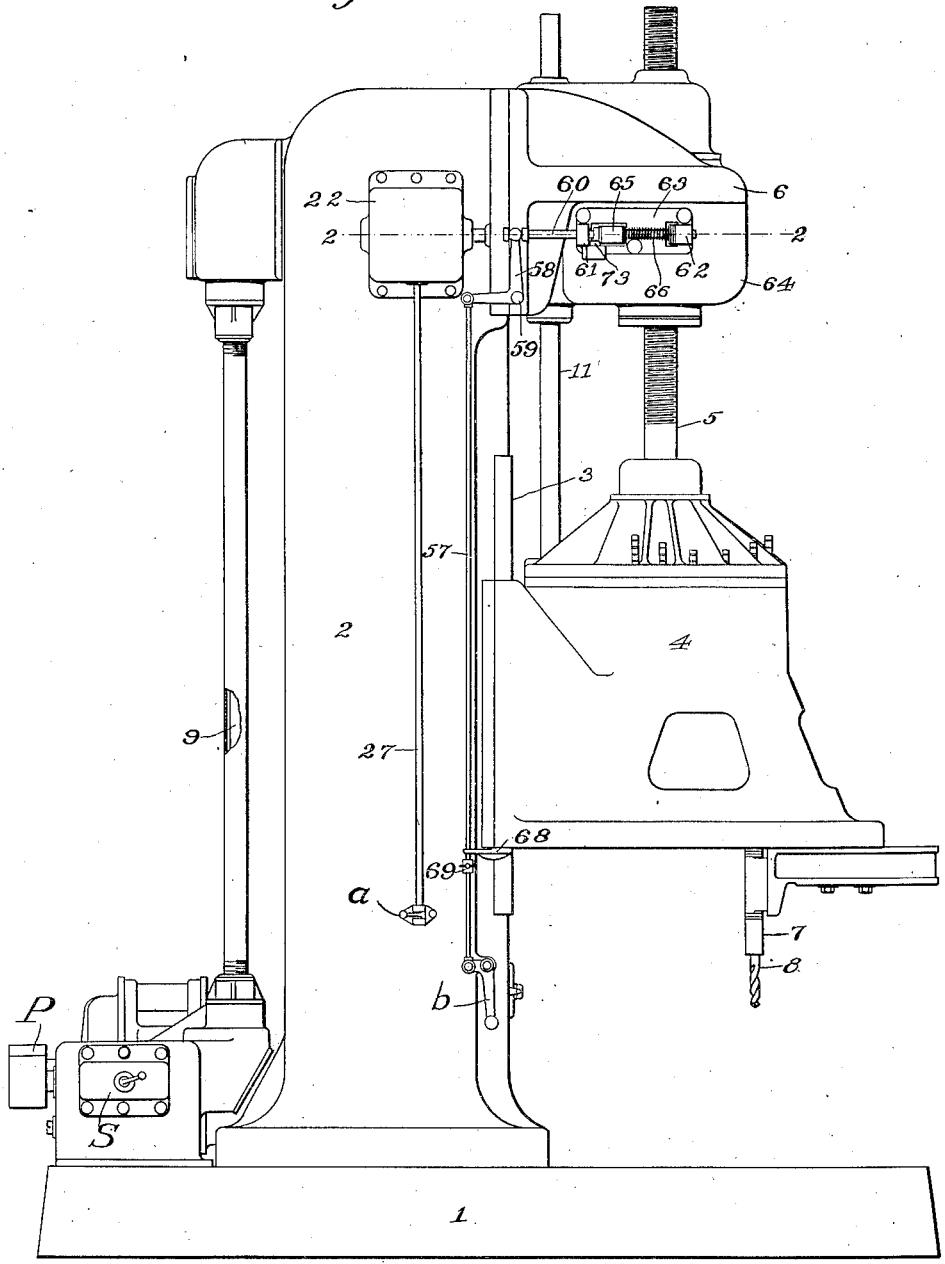

Nov. 6, 1928.

R. M. GALLOWAY 1,690,163

SCREW FEED AND RAPID TRAVERSE MECHANISM

Filed Jan. 26, 1924    2 Sheets-Sheet 1

Inventor
Robert M. Galloway
By Attorney
Albert F. Nathan

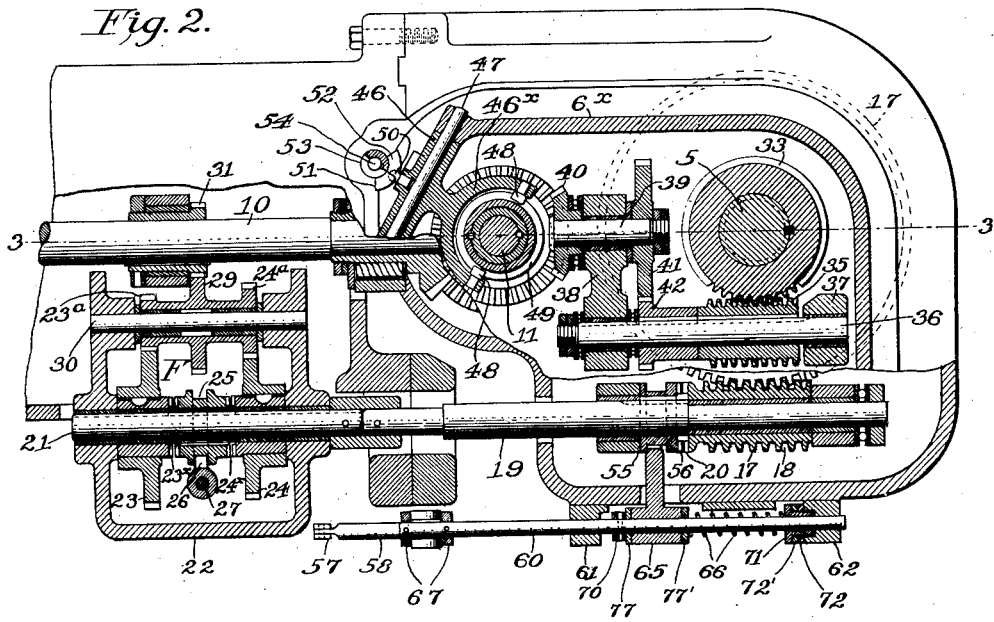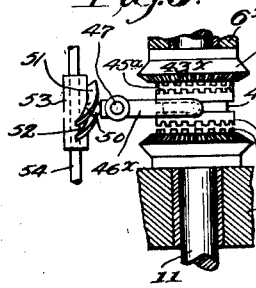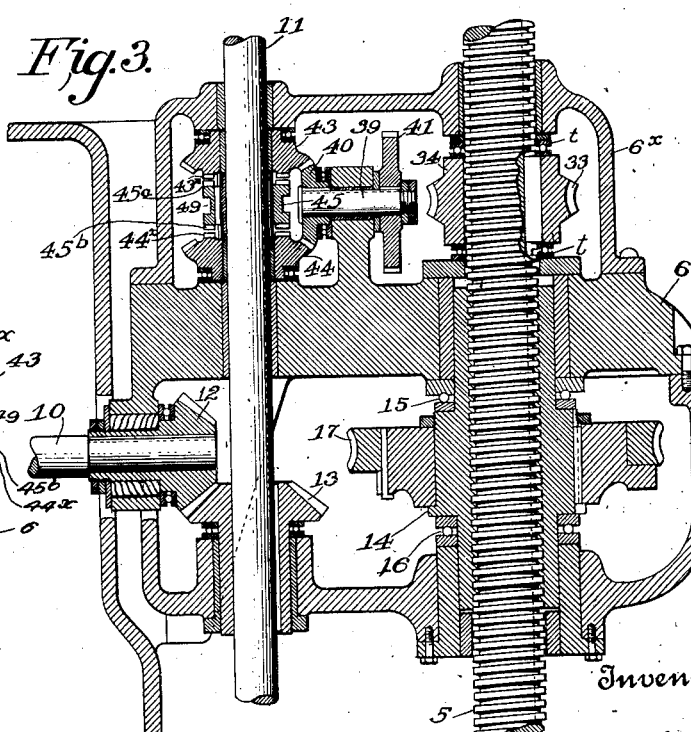

Patented Nov. 6, 1928.

1,690,163

UNITED STATES PATENT OFFICE.

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA.

SCREW-FEED AND RAPID-TRAVERSE MECHANISM.

Application filed January 26, 1924. Serial No. 688,753.

This invention relates to feeding mechanisms for machine tools and more particularly to a mechanism for feeding, at varying rates of speed, the tool-head of a multiple tool machine toward and from the work. For the sake of convenience the invention is shown and described as embodied in a multiple drilling machine but it is to be understood that it is likewise adaptable to any other machine tool having the same general characteristics.

In machines of this character there is provided a work-support and a head vertically movable with respect thereto and carrying a plurality of drill spindles. A suitable power shaft extends into the movable drill-head and affords means for rotating all of the drill spindles. These machines also usually include power means for moving the drill-head toward and from the work held upon the work support whereby the drill, or drills, being operated are first brought into contact with the work and then given a further downward movement until a hole, or holes, have been drilled to the desired depth, whereupon the feed is reversed and the drills are withdrawn from the work.

This invention has for an object so to improve the feeding mechanisms of machines of this character that the time required to bring the tool into contact with the work and to retract it therefrom, after the drilling operation has been completed, will be greatly reduced, and the production of the machine proportionately increased.

More specifically stated this invention has for an object to provide, in a drilling machine of this character, a feeding mechanism constructed and arranged to produce a rapid feed of the drill head downwardly until the drill points approach the work; then to give it a continued downward feed at a materially reduced speed until the holes have been drilled to the desired depth; and then to retract the drill-head and drill at a rate substantially the same as the rapid downward movement. Thus greatly reducing the time required for a complete drilling operation.

A further object of the invention is to provide simple and effective means for locking the feeding mechanisms when they are not in operation.

These objects have been attained in a very ingenious manner by providing two independent feeds for the drill-head which are operative at substantially different speeds and by having these feeds so constructed and arranged that either may be rendered effective to feed the drill-head downwardly at a predetermined high or low speed; or they may be rendered effective simultaneously to give the drill-head a downward feed at the combined rate of both feeds; or they may be operated simultaneously in opposite directions to give the drill head a movement, the rate of which is the difference of the two feeds.

These feeding mechanisms preferably comprise a threaded shaft which supports the drill head and a non-translatable nut threaded thereon, thus by holding the shaft against rotation and rotating the nut on the threaded shaft the shaft and the drill head supported thereon will be moved toward, or from, the work-support at a predetermined low speed. Separate means is provided for rotating the threaded shaft while the nut is held against rotation which likewise causes endwise movement of the threaded shaft with its attached drill-head at a predetermined high speed. The threaded shaft and the nut are each preferably rotated by a worm and worm-gear, and disconnectible clutch mechanisms are provided between these worms and the power shaft. Thus when either of the feeds is disconnected from the power shaft the angle of the threads of the worm and worm-gear prevent accidental rotation of the disconnected feed. To afford means for varying the rate of travel of the slow feed, which is the feed used during the drilling operation, there is preferably provided a change-gear mechanism by means of which the speed of rotation of the non-translatable nut may be regulated.

A reversing mechanism is embodied in the rapid feed whereby the drill head may either be raised or lowered rapidly.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 4:
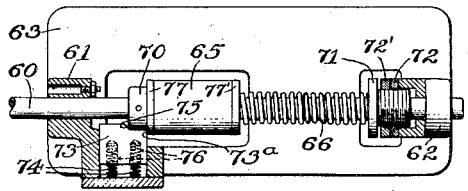

Fig. 1 is a side elevation of a multiple drilling machine embodying the present invention. Fig. 2 is an enlarged horizontal section taken on the line 2—2 of Fig. 1. Fig. 3 is a vertical section taken on the line 3—3 of Fig. 2. Fig. 4 is a detail view of a clutch shifting and latching mechanism. Fig. 5 is a detail view of a clutch shifting mechanism for controlling the direction of the head movement.

Referring more particularly to the drawings, the invention is disclosed as embodied in a multiple drilling machine comprising a base 1, supporting a column 2, provided with vertical guides as 3 upon which is slidably mounted a drill head 4. This drill head is supported upon a threaded shaft 5 translatably journaled in a hollow bracket 6, secured upon the column 2, in a manner later to be described. Suitable spindles as 7, (one only of which is shown) are carried by the drill head and are each provided with a drill 8. These spindles are adapted to be rotated from a source of power represented by P through a speed box S, vertical shaft 9, horizontal shaft 10 connected to a vertical shaft 11, as by bevel gears 12 and 13. The shafts 9 and 10 are likewise connected together by bevel gears and the shaft 11 is connected to rotate the drill spindles, but as the mechanism for rotating the drill spindle is old and forms no part of the present invention further detailed illustration and description thereof is deemed unnecessary.

As before stated, this invention relates particularly to the feeding of the drill-head vertically and to that end the shaft 5, which supports the weight of the drill head 4, is threaded through a nut 14 held against endwise movement in the bracket 6 as by means of thrust bearings 15 and 16. To the nut 14 is secured a worm-wheel 17 which meshes with a worm 18 loosely journaled on a shaft 19 and is provided with clutch teeth 20. The shaft 19 is operatively connected with a shaft 21 journaled in a gear box 22 secured to the column 2. This gear box carries a suitable change gear mechanism indicated generally as F. Gear members 23 and 24 provided with clutch elements 23× and 24× respectively are loosely journaled upon the shaft 21. A clutch member 25 is splined to the shaft 21 and is adapted to be shifted laterally selectively to engage either the gear 23 or the gear 24, by means of a fork 26 secured upon one end of a manually rotatable rod 27 having at its lower end a hand-lever $a$. A gear-unit G, comprising gears 23$^a$, 24$^a$, and 29 is loosely journaled upon a shaft 30 also supported in the gear box 22. The gears 23$^a$ and 24$^a$ are permanently in mesh with the gears 23 and 24 and the gear 29 is likewise permanently in mesh with a gear 31 fixed upon the shaft 10. A shiftable clutch element 55 having clutch teeth 56, adapted to engage the clutch teeth 20, is splined to the shaft 19 and affords means for operatively connecting the worm with that shaft.

From the foregoing it will be observed that the nut 14 may be rotated continuously or intermittently from the source of power P, and obviously if the shaft 5 is held against rotation the shaft together with the drill head supported thereby will be moved vertically downward at a predetermined relatively slow speed. It is this relatively slow feed that is utilized to feed the drills into the work. Rotation of the shaft 5 is prevented by a worm-gear 33, having its hub 34 splined to the shaft. This worm gear is held against lengthwise movement in a hood 6×, supported by the bracket 6 by thrust-bearings $t$ and meshes with a worm 35 later to be referred to. The threads connecting the worm 35 and worm-wheel 33 are of a sufficiently flat angle to prevent the worm from being driven backwardly by the torque of the worm-gear 35 caused by the friction of the threads of the screw 5 and nut 14.

To effect a rapid elevation or depression of the drill head, as when bringing the drills into contact with the work and when elevating the drill head after the drilling operation, means are provided for rotating the shaft 5 in the threaded nut 14, at a much higher rate than the rotation of said nut. To this end the worm 35 is fixed upon a shaft 36 journaled in bearings 37 and 38 carried by the bracket 6. The bearing 38 also supports a stub shaft 39 to which is secured, at its opposite ends, a bevel gear 40 and a spur gear 41. The latter gear is maintained permanently in mesh with a like gear 42 fixed to the shaft 36. Power is supplied to the bevel-gear 40 to rotate it in reverse directions by either of the two bevel-gears 43 and 44 loosely journaled upon the shaft 11. The gears 43 and 44 are provided with clutch-teeth 43× and 44× respectively which are adapted selectively to be engaged by the clutch-teeth 45$^a$ and 45$^b$ of a shiftable clutch-member 45 splined to the shaft 11.

A clutch-shifter 46, loosely journaled on a rod 47, carried by the hood 6×, has its forked end 46× provided with studs 48 which engage an annular groove 49 in the clutch member 45. This member affords means for shifting that member lengthwise of the shaft 11 to engage either the clutch teeth 43× and 45$^a$ or the teeth 44× and 45$^b$ dependent upon the direction it is desired to move the drill-head. The clutch-shifter 46 also carries a stud 50 which extends between spaced plates 51 and 52 formed integral with a collar 53 fixed upon an upright shaft 54. Thus by actuating the shaft, either manually or mechanically, the clutch-shifter may be rocked to cause the member 45 to drive either through the gear 43 or through the gear 44 to effect the desired rotation of the shaft 5.

The operation of the device embodying the present invention is as follows: Suppose the machine to be at rest with the drill head in its uppermost position, and with the clutches 25, 45 and 55 in their neutral positions. To start the machine power is applied at P which, through the shaft 9, is transmitted to the shaft 10. This shaft, through the bevel gears 12 and 13 rotates the shaft 11 which in turn rotates the various drill spindles in a manner common to machines of this character. Inasmuch as the drill head and the drills carried thereby are at this time located a substantial distance above the work to be operated on and as it is desirable to bring the drills into contact with the work as quickly as possible, to prevent loss of time, the rapid feed is then brought into action. This is accomplished by shifting the clutch 45 to couple the gear 44 with the shaft 11, which through the gears 41 and 42, worm 35 and worm-gear 33 rapidly rotate shaft 5 through the nut 14. When the drill points have approached the work the rapid feed is discontinued by shifting the clutch 45 into its neutral position. The slow feed is then thrown into action by manually manipulating the hand-lever $a$ on the shaft 27 to shift the clutch 25 and thereby couple either of the gears 23 or 24 with the shaft 21. The clutch-member 55, splined to the shaft 19 and having clutch-teeth 56, is then shifted to cause it to engage the clutch-teeth 20 on the worm 18. This shifting may be accomplished by means of a lever $b$, fulcrumed on the column 2, which is connected by a rod 57 to a belt-crank lever 58 pivoted at 59 to the bracket 6. A rod 60 is translatably journaled in lugs 61 and 62 formed on a plate 63 which latter is secured to a housing 64 carried by the bracket 6. Upon the rod 60 is loosely mounted, between loose plates 77 and 77', a clutch-shifter 65 having a forked end which engages an annular groove in the clutch-member 55. The rod 60 also carries a fixed collar 70 which acts as an abutment to limit the movement of the plate 77 and the clutch shifter under the action of a spring 66 which, at one end, bears against the plate 77 and normally acts to disengage the clutch 50 from the clutch 20. The opposite end of the spring 66 bears against a collar 71, loose upon the rod 60 and is provided with a hub upon which are threaded an adjusting nut 72 and a lock-nut 72'. The adjusting nut 72 is maintained in contact with the lug 62 and affords means for shifting the collar 71 lengthwise of the rod thereby regulating the tension of the spring 66. The bell-crank lever 58 has its upper end fitted between collars 67 secured to the rod 60 whereby upward movement of the rod 57 acts, through the bell-crank 58, to shift the rod 60 to the right (as viewed in Fig. 2) against the action of the spring 66 to engage the clutch teeth 56 and 20.

A latch mechanism, (see Fig. 4) comprising a plate 73 slidably mounted in a vertical guideway 73' in the lug 61, is provided for holding the clutch-shifter in its adjusted position thereby maintaining the clutch teeth 56 and 20 in engagement and effecting a continued downward feed of the drill-head after the hand lever $b$ has been released. The plate is forced upwardly in the guideway by springs 74 held in cavities 76 in the plate and having their projecting ends seated upon the lower wall of the lug 61. The upper end of the plate 73 provides a shoulder 73$^a$ which, when the rod 60 is shifted to engage the clutch members, snaps behind the plate 77 and thereby prevents the spring 66 from disconnecting the clutches.

A cam 75 formed on the upper edge of the plate 73 cooperates with the collar 70 and affords means for retracting the latch to permit the clutches to be disengaged. When the holes have been drilled to the desired depth a dog 68 carried by the drill-head engages a stop 69 adjustably secured to the rod 57 and moves the rod downwardly. This downward movement of the rod 57 swings the bell-crank lever 58 which pulls the rod 60 to the left (as viewed in Fig. 4). The initial movement of the rod causes the collar 70 to withdraw from the plate 77 and ride up the cam 76 thus depressing the latch-plate 73. The height of the cam is such that when the plate is completely depressed the shoulder 73$^a$ is withdrawn from the plate 77 and the spring 66 (then under tension) quickly shifts the member 65 and disconnects the clutch teeth 56 and 20 thereby stopping the downward feed of the drill-head. The clutch 45 may then be shifted to engage the bevel-gear 43 to effect the rapid upward feed of the drill-head.

It is to be understood that during a continued operation of the machine the slow feed need not be discontinued before the rapid feed is thrown into action but that they both may be operating simultaneously. In this instance the downward feed will be greater than the upward feed by twice the feeding velocity of the slow feed, whereas if the slow feed is out of action the rapid feed will be the same in either direction. However as the feeding velocity of the slow feed is so small as compared with the rapid feed that the rapid traverse velocity is substantially the same in both directions even when both feeds are in action.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A machine tool combining a frame; a member adapted to be fed and retracted on said frame; a slow feeding mechanism for said member, said mechanism comprising a threaded shaft translatable in said frame and supporting said member; a nut having a threaded connection with said shaft; a worm-wheel coaxial and rotatable with said nut; a worm to drive said worm wheel, said worm and worm-wheel comprising a non-reversible drive; means to rotate said worm; a rapid traverse for said member comprising a non-translatable worm-wheel splined to said shaft; a worm to drive said worm-wheel; means independent of the slow feed transmission to rotate said last named worm; and means to render either of said member translating mechanisms effective.

2. A machine tool combining a frame; a member movable thereon; a support for said movable member; said support comprising a threaded shaft translatably journaled in said frame; a nut on said threaded shaft; means for preventing relative bodily movement between said nut and said frame; a worm-gear fixed to said nut; a worm meshing with said worm gear; a power shaft; an intermediate shaft loosely supporting said worm; a change-gear mechanism between said power shaft and said intermediate means for selectively engaging the gears of said change-gear mechanism for transmitting to said intermediate shaft any one of a predetermined number of speeds; a clutch for securing said worm to said intermediate shaft; a worm-gear splined to said threaded shaft; and a worm meshing with said worm-gear and cooperating therewith to prevent rotation of said threaded shaft.

In witness whereof, I hereunto subscribe my name.

ROBERT M. GALLOWAY.